May 26, 1942.  G. E. FORD  2,284,048

THERMOMETER CONSTRUCTION

Filed April 21, 1939  2 Sheets-Sheet 1

INVENTOR
GEORGE E. FORD
BY
ATTORNEY

May 26, 1942. G. E. FORD 2,284,048
THERMOMETER CONSTRUCTION
Filed April 21, 1939  2 Sheets-Sheet 2
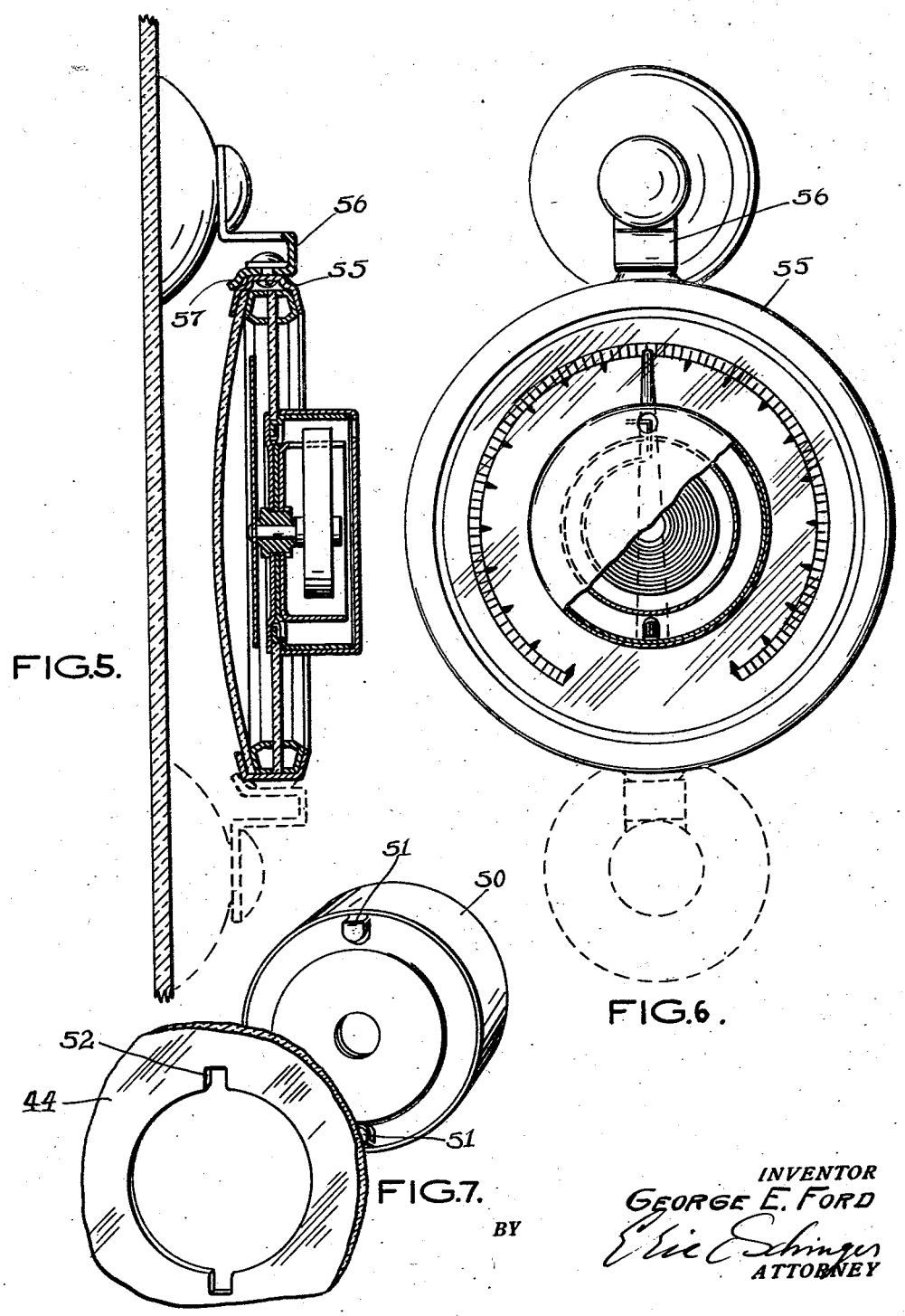
INVENTOR
GEORGE E. FORD
BY
ATTORNEY Patented May 26, 1942

2,284,048

UNITED STATES PATENT OFFICE 2,284,048

THERMOMETER CONSTRUCTION

George E. Ford, Rochester, N. Y., assignor to Rochester Manufacturing Co. Incorporated, Rochester, N. Y., a corporation of New York Application April 21, 1939, Serial No. 269,192

7 Claims. (Cl. 73—367)

This invention relates to thermometers and other instruments having indicating dials and the invention has for its object to provide a novel supporting structure for the mechanism of the instrument on a translucent dial so that the dial graduations and the position of the pointer relative thereto may be observed from either the front or rear of the instrument.

Another object of this invention is to provide a combined supporting structure and translucent dial for indicating instruments so that the dial may be efficiently illuminated from the rear to make for clear and accurate indications by the pointer on the dial.

A further object of this invention is to provide a novel supporting structure for the thermo-responsive coil of a thermometer.

Still another object of this invention is to provide a novel supporting structure for angularly supporting an instrument having a translucent dial.

A still further object of the invention is to provide means whereby the dial which supports the operating mechanism of the instrument is locked to the mechanism in a predetermined position relative thereto.

Another object of the invention is to provide a novel construction for a refrigerator thermometer.

All these and other objects and attendant advantages of the invention will become more clearly apparent from the detailed description thereof which follows, reference being had to the accompanying drawings in which—

Figure 5 is a vertical sectional view of the thermometer provided with a modified form of suction cup mounting.

Figure 6 is a rear elevation of the thermometer with the modified form of suction cup mounting with the housing surrounding the bi-metallic element partly broken away.

Figure 7 shows detail perspective views of a portion of the dial and the housing adapted to be supported thereon.

Figure 1:
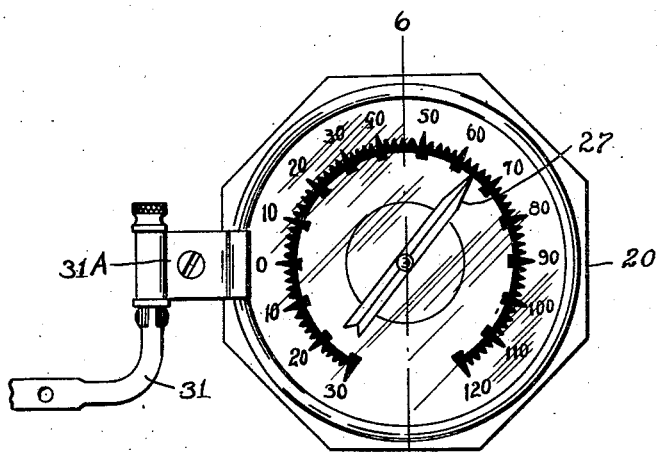
Figure 1 is a front elevation of a window thermometer embodying my invention.
Figure 2:
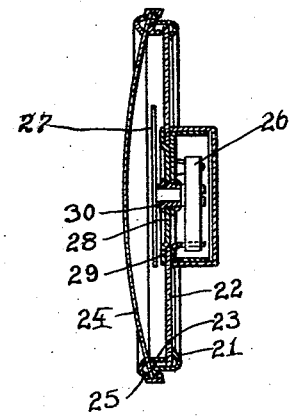
Figure 2 is a vertical sectional view thereof.

In the construction of the window thermometer illustrated in Figures 1 and 2, the housing is formed by the octagon shaped metal frame 20 which is provided at the rear with the inwardly extending flange 21. The translucent dial 22 is firmly held against this flange by means of the spacing ring 23 which in turn has the edge portion of the crystal 24 clamped thereagainst by means of the bezel 25.

The casing which encloses the bi-metallic coil 26 for the operation of the pointer 27 of the thermometer has a clamping plate 28 attached to the front thereof and the offset circular flange 29 of this clamping plates provides an annular channel for the edge of the central perforation of the dial to project thereinto and thus hold the casing centrally supported on the translucent dial. In the form of construction illustrated in Figure 2, the clamping plate 28 is attached to the casing by means of suitable annular shoulders provided on the outside of the pointer bearing 30. A suitable supporting bracket 31 is used to support the thermometer in a position in which a light source at the rear of the dial will efficiently illuminate the translucent dial and set off the indications provided thereon and show the position of the pointer relative thereto, thus providing a quick and accurate reading of the instrument. The bracket 31 carries clamping member 31A with which the thermometer housing may be held in any desired position on the bracket.

Figure 3:
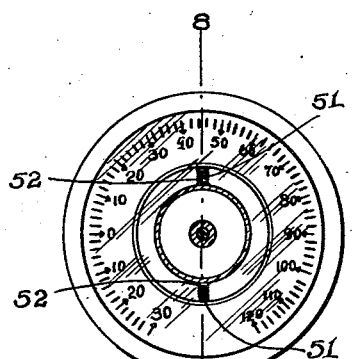
Figure 3 is a sectional view of a thermometer embodying my invention for use on an inclined windshield of an automobile, the section being taken on the line 7—7 of Figure 4.
Figure 4:
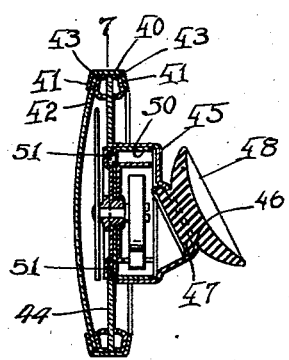
Figure 4 is a section of the automobile thermometer taken on the line 8—8 of Figure 3.

The automobile thermometer illustrated in Figures 3 and 4 comprises a cylindrical housing 40 with annular flanges 41, 41 at the front and back thereof. These flanges embrace the edge portion of the crystal 42, the spacing rings 43, 43 and the edge portion of the translucent dial 44. In this way the crystal 42 is clamped in place between a flange 41 and a spacing ring 43 while the translucent dial is clamped between the two spacing rings. The spacing rings 43 engage the dial adjacent the outer edge and at a distance from the edge. A considerable edge portion of the dial is thus held clamped between the spacing rings in order to stiffen the dial in its mounting. By having the center of the dial cut out and by mounting the casing carrying the bi-metallic coil and pointer in this cut out portion, the bendable dial area is further reduced while the attachment of the casing into the opening increases the rigidity of the dial. The thermometer construction is thus considerably strengthened for shipping, handling and mounting.

The casing for the bi-metallic member is centrally mounted and supported on the translucent dial in the manner shown and described in connection with the window thermometer. However, the outer casing 45, which is telescoped over the inner casing to close the back thereof, is formed so as to be partially inclined at the rear with an opening 46 in the inclined portion.

The attaching button 47 of the rubber vacuum cup 48 is adapted to be inserted thru the opening 46 to thereby anchor the vacuum cup to the back of the casing in an inclined position. The angle at which the vacuum cup is held is such that when attached to the glass plate of an inclined windshield of an automobile it will support the thermometer in a substantially vertical position. The cup is also arranged at the back of the casing so that it will not project beyond the edges thereof and prevent light passing thru the windshild from efficiently illuminating the dial from the rear thereof.

The automobile thermometer will be illuminated at night by the light from the headlights of approaching cars so that the driver may read the temperature at night without the aid of a special light. This form of thermometer may also be attached to the illuminated portion of the instrument panel or centrally of the glass cover of an illuminated clock to have the light of the panel or clock also illuminate the dial of the thermometer.

Because of the fact that the automobile thermometer will have its housing subjected to a twisting motion in the attachment and detachment of its suction cup mounting to and from the windshield, the inner casing 50 which carries the thermo-responsive element, the pointer stem and pointer, has the lugs 51, 51 struck out at the front thereof. These lugs engage corresponding notches 52, 52 in the edge of the central opening in the dial 44 to hold the casing and with it the thermo-responsive element, pointer stem and pointer in a fixed predetermined position relative to the dial and its graduations. In this way the pointer cannot be displaced on the dial in the attachment or detachment of the suction cup mounting of the thermometer. The casing 50 its lugs 51, and the dial 44 with its corresponding notches 52 are illustrated in detail in Figure 7.

The use of a non-conductor of heat in the dial of a window thermometer for the support of the thermo-responsive element of the thermometer heat insulates the thermo-responsive element from the sun rays so that the influence of the sun rays on the element is reduced to a minimum. The use of a small case for the purpose of housing the bi-metallic element centrally of the dial which is made possible by its support on the dial also reduces to a minimum the absorption of heat from sunrays by the housing. The influence of sunrays on the thermometer is thus further reduced and the accuracy of the operation of the thermometer as the result of it is increased.

When the thermometer is mounted on a windshield, window pane or glass cover, the heat insulation of the thermo-responsive element provided by the dial is supplemented by the use of one or more rubber suction cups for the mounting members of the dial. In Figure 4 I have illustrated the suction cup applied to the housing which encases the thermo-responsive element in such a manner that the thermometer may be held in a substantially vertical position on an inclined windshield. However, a similar result may be obtained by the attachment of the rubber suction cup to the bezel 55 of the thermometer as illustrated in Figures 5 and 6.

In this construction the rubber suction cup is provided with a bracket 56 to which the bezel is attached as illustrated in Figure 5. A yielding lug 57 of the bracket is adapted to engage a portion of the edge of the front or rear of the bezel so that the thermometer, when held in place, will always present a full undistorted view of the dial thru its glass support either in front or in back of a glass pane. The thermometer housing, when forcibly turned, will temporarily displace the lug 57 so as to allow it to be reversed on the bracket for inside or outside mounting.

I claim:

1. In a thermometer or the like, the combination of a dial having an opening therethru and a notch extending from said opening, a casing clamped to the edge surrounding the opening in said dial, a lug on said casing for engagement into the notch so as to hold said casing against rotation on said dial, thermo-responsive means in said casing and a pointer operatively connected with said thermo-responsive means for movement over said dial.

2. In a thermometer or the like for attachment to an inclined surface, the combination of a housing, a translucent dial within said housing, a casing supported on said dial substantially centrally thereof, means carried by said casing and engaging said dial so as to hold said casing against rotation on said dial, a pointer stem journaled in said casing, a bi-metallic coil in said casing and connected to said stem, a pointer carried by said stem for movement over said dial, a suction cup, and means for angularly holding said suction cup within the outline of said casing at the rear thereof.

3. In a thermometer or the like for attachment to the inclined windshield of an automobile, the combination of a dial, a casing supported by said dial substantially centrally thereof, a bi-metallic coil in said casing, a pointer operatively connected with said coil for movement over said dial, a cover for said casing, an inclined pocket in said cover for a rubber suction cup anchored in said inclined pocket for mounting engagement with the windshield and the support of the thermometer in a substantially vertical position.

4. In a thermometer or the like for attachment to the inclined windshield of an automobile, the combination of a housing, a translucent dial within said housing, a pair of spacing rings mounted in said housing for engagement of opposite sides of said dial, a casing supported by said dial substantially centrally thereof, a bi-metallic coil in said casing, a pointer operatively connected with said coil for movement over said dial, a cover for said casing, an inclined pocket in said cover and a rubber suction cup anchored in said inclined pocket for mounting engagement with the windshield and the support of the thermometer in a substantially vertical position.

5. In a thermometer and the like the combination of a dial, a bezel surrounding said dial, a pair of substantially channel shaped spacing rings embraced by said bezel and arranged to engage opposing sides of said dial so as to stiffen the dial by its contact with the sides of the dial adjacent the edge and at a spaced point from the edge, and a thermo operated indicating means supported by the dial.

6. In a thermometer and the like the combination of a dial of thin sheet material having an open center and a casing mounted in and closing said open center and engaging the edges thereof to provide a rigid center for said dial and increase the rigidity of the entire dial and thermo operated indicating means pivotally supported by said casing in the open center of said dial.

7. In a thermometer and the like the combination as set forth in claim 6 in which said dial is translucent and said casing is provided with means for the support of said casing and said dial within the outline of said casing to permit unobstructed passage of light thru the dial around the casing.

GEORGE E. FORD.